(12) United States Patent
Wang et al.

(10) Patent No.: US 8,547,614 B2
(45) Date of Patent: Oct. 1, 2013

(54) 3-COLORANT DOT-OFF-DOT (DOD) PERIODIC HALFTONE GEOMETRY

(75) Inventors: Shen-ge Wang, Fairport, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 403 days.

(21) Appl. No.: 12/956,469

(22) Filed: Nov. 30, 2010

(65) Prior Publication Data

US 2012/0133990 A1 May 31, 2012

(51) Int. Cl.
*H04N 1/46* (2006.01)

(52) U.S. Cl.
USPC ........ 358/533; 358/3.06; 358/3.07; 358/3.26; 358/534; 358/536

(58) Field of Classification Search
USPC .............. 358/3.03–3.24, 3.26–3.27, 533–536
See application file for complete search history.

(56) References Cited

U.S. PATENT DOCUMENTS

| | | | | |
|---|---|---|---|---|
| 4,965,599 | A * | 10/1990 | Roddy et al. | 347/240 |
| 5,381,247 | A | 1/1995 | Hains | |
| 5,594,839 | A | 1/1997 | Shu | |
| 5,680,222 | A * | 10/1997 | Ashworth | 358/3.16 |
| 5,898,822 | A * | 4/1999 | Holladay | 358/1.9 |
| 6,985,256 | B2 * | 1/2006 | Cheng et al. | 358/1.9 |
| 6,985,262 | B2 * | 1/2006 | Wang | 358/3.26 |
| 7,394,571 | B2 | 7/2008 | Harrington | |
| 7,826,095 | B2 * | 11/2010 | Wang et al. | 358/3.01 |
| 7,839,537 | B2 * | 11/2010 | Tai et al. | 358/3.2 |
| 2002/0089708 | A1 * | 7/2002 | Cheng et al. | 358/534 |
| 2008/0130054 | A1 * | 6/2008 | Wang et al. | 358/3.03 |
| 2008/0130056 | A1 * | 6/2008 | Wang et al. | 358/3.06 |
| 2008/0170280 | A1 * | 7/2008 | Wang et al. | 358/534 |
| 2009/0091795 | A1 * | 4/2009 | Wang | 358/3.06 |
| 2009/0213430 | A1 * | 8/2009 | Wang | 358/3.2 |
| 2010/0135702 | A1 | 6/2010 | Calamita et al. | |

OTHER PUBLICATIONS

"Principles of Color Reproduction", by J. A. G. Yule, John Wiley & Sons, N.Y., Chapter 13, 1967.
"Description of Flamenco Screens: C. Eliezer, Color Screening Technology: A Tutorial on the Basic Issues," The Seybold Report on Desktop Publishing, vol. 6, No. 2, pp. 3-25, Oct. 1991.
Warren L. Rhodes and Charles M. Hains, "The influence of halftone orientation on color gamut and registration sensitivity,"*Proc. IS&T's 46th Annual Conference*, pp. 180-182, May 1993.
"Misregistration Sensitivity in Clustered Dot Halftones," B. Oztan, G. Sharma, R. Loce, *Journal of Electronic Imaging* 17(2), 023004, Apr.-Jun. 2008).
S. Wang, Z. Fan and Z. Wen, "Non-orthogonal halftone screens," *Proc. NIP18: International Conference on Digital Printing Technologies*, pp. 578-584, 2002.
U.S. Appl. No. 12/539,925, filed Aug. 12, 2009, Wang et al.
U.S. Appl. No. 12/539,848, filed Aug. 12, 2009, Wang et al.
U.S. Appl. No. 12/647,652, filed Dec. 28, 2009, Wang et al.

* cited by examiner

*Primary Examiner* — Richard Zhu
(74) *Attorney, Agent, or Firm* — Fay Sharpe LLP

(57) ABSTRACT

Provided is a 3-colorant DOD (dot-off-dot) periodic halftone geometry used to render an image. The DOD 3-colorant halftone geometry includes a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$.

18 Claims, 10 Drawing Sheets
(9 of 10 Drawing Sheet(s) Filed in Color)

3-COLORANT DOT-OFF-DOT (DOD) PERIODIC HALFTONE GEOMETRY

CROSS REFERENCE TO RELATED PATENTS AND APPLICATIONS

The following patent applications, the disclosures of each being totally incorporated herein by reference are mentioned:

U.S. patent application Ser. No. 12/539,925, Filed Aug. 12, 2009, entitled "MOIRÉ-FREE COLOR HALFTONING METHODS, APPARATUS AND SYSTEMS," by Wang et al.

U.S. patent application Ser. No. 12/539,848, entitled "MOIRÉ-FREE COLOR HALFTONING METHODS, APPARATUS AND SYSTEMS," by Wang et al., filed Aug. 12, 2009.

U.S. patent application publication No. 2008/0130054, published Jun. 5, 2008, entitled "N-COLOR PRINTING WITH HEXAGONAL ROSETTES," by Shen-Ge Wang et al.

U.S. patent application publication No. 2008/0130055, published Jun. 5, 2008, entitled "MOIRÉ-FREE COLOR HALFTONE CONFIGURATION EMPLOYING COMMON FREQUENCY VECTORS," by Shen-Ge Wang et al.

U.S. patent application publication No. 2008/0130056, published Jun. 5, 2008, entitled "ROSETTE PRINTING WITH UP TO FIVE COLORS," by Shen-Ge Wang et al.

BACKGROUND

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding colorant spot is either printed or not printed at a specified location or pixel. Digital halftoning controls the printing of colorant spots, where the spatial averaging of the printed colorant spots by either a human visual system or a viewing instrument, provides the illusion of the required continuous color tones. In the art of printing, the color tone that results from the overlay of the halftone spots from multiple colorants is often referred to as "process color." Color separations can be thought of as multiple channels that can be used to define the color of an image. Color separations are sometimes called colorant separations because they are used to specify amounts of colorants required to achieve a target perception of color.

The most common halftone technique is screening, which compares the required continuous tone colorant level of each pixel for each color separation with one or more predetermined threshold levels. The predetermined threshold levels are typically defined for a rectangular cell that is tiled to fill the plane of an image, thereby forming a halftone screen of threshold values. At a given pixel if the required continuous tone colorant level is darker than the threshold halftone level, a colorant spot is printed at that specified pixel. Otherwise the colorant spot is not printed. The output of the screening process is a binary pattern of multiple small "dots", which are regularly spaced as is determined by the size, shape, and tiling of the halftone cell. In other words, the screening output halftone image separation, as a two-dimensionally repeated pattern, possesses two fundamental spatial frequencies, which are completely defined by the geometry of the halftone screen.

It is understood in the art that the distribution of printed pixels in a color halftone image separation depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs", X-shapes, pinwheels, and pincushions, and actual printed dots can possess distortions and fragmentation of those idealized shapes introduced by digitization and the physical printing process. Various digital halftone screens having different shapes and angles are described in "An Optimum Algorithm for Halftone Generation for Displays and Hard Copies", by T. M. Holladay, Proc. Soc. for Information Display, 21, p. 185, 1980.

A common problem that arises in digital color halftoning is the manifestation of moiré patterns. Moiré patterns are undesirable interference patterns that occur when two or more color halftone image separations are printed over each other. Since color mixing during the printing process is a non-linear process, frequency components other than the fundamental frequencies and harmonics of the individual color halftone image separations can occur in the final printout. For example, if an identical halftone screen is used for two color image separations, theoretically, there should be no moiré patterns. However, any slight misalignment between the two color halftone image separations occurring from an angular difference and/or a scalar difference will result in two slightly different fundamental frequency vectors. Due to nonlinear color mixing, the difference in frequency vectors produces a beat frequency which will be visibly evident as a very pronounced moiré interference pattern in the output. Additionally, lateral displacement misregistration can result in significant color shifts if an identical halftone screen is used for two color image separations. To avoid, for example, two-color moiré patterns and other color shifts due to misalignment and misregistration, or for other reasons, different halftone screens are commonly used for different color image separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color image separations, it is desirable to avoid any two-color moiré as well as any three-color moiré. It is well known that in the traditional printing industry that three halftone screens, which can be constructed by halftone cells that are square in shape and identical, can be placed at 15°, 45°, and 75°, respectively, from a point and axis of origin, to provide the classical three-color moiré-free solution. This is described in "Principles of Color Reproduction", by J. A. G. Yule, John Wiley & Sons, N.Y., 1967.

For digital halftoning, the freedom to select a rotation of a halftone screen is limited by the raster structure, which defines the position of each pixel. Since tan(15°) and tan(75°) are irrational numbers, a halftone screen at a rotation of 15° or 75° cannot be implemented exactly in digital halftoning. To this end, some methods have been proposed to provide approximate instead of exact moiré-free solutions. For example, in U.S. Pat. No. 4,916,545, moiré is suppressed by randomly varying the dot fonts that are used to write successive halftone dots in the screened image. In U.S. Pat. No. 5,442,461, strips of a rational angled screen are concatenated to approximate an irrational angled screen. Errors which accumulate with each successive pixel are corrected by occasionally jumping to a new point in the strip. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

Notably, DOD screens are known to produce much finer textures than conventional rotated dot screens. While rotated dot screens have the advantage of insensitivity to registration, they do have the negative drawback of possessing a texture frequency component, i.e. the rosette, that is roughly half of the halftone frequency. Conversely, periodic dot-off-dot screens have the desirable attribute of possessing an apparent frequency that is significantly higher than the single-separation halftone frequency. If a printer can achieve tight color-to-color registration, dot-off-dot screens can generate acceptable textures using very low frequency halftones, which could drastically reduce spatial noise and print-to-print color variation. Furthermore, it could also improve the basic appearance of the halftone texture because there would not be rosettes at ½ the halftone frequency. In addition to texture improvements, dot-off-dot halftones produce a larger gamut than rotated halftone screens.

The above indicated patents and citations provide a background basis for the disclosure as taught in the specification which follows below, and further for each of the patents and citations above, the disclosures therein are totally incorporated herein by reference in their entirety for their teachings.

As provided herein, there are supplied teachings to systems and methods that utilize a 3-colorant DOD periodic halftone geometry.

INCORPORATION BY REFERENCE

The following references are incorporated herein by reference in their entirety:

"Principles of Color Reproduction", by J. A. G. Yule, John Wiley & Sons, N.Y., 1967.

"Description of Flamenco Screens: C. Eliezer, "Color Screening Technology: A Tutorial on the Basic Issues," The Seybold Report on Desktop Publishing, Vol. 6, No. 2, Pages 3-25, October, 1991.

U.S. Pat. No. 5,594,839, entitled "Apparatus and Method for Improving Black and Color Separation in Halftoned Images by Printing Black Dots in a Different Screen Phase," by Shu, issued Jan. 14, 1997.

U.S. Pat. No. 7,394,571, entitled "Method for Multi-Color, Clustered, Dot-Off-Dot Halftoning," by Harrington, issued Jul. 1, 2008.

Warren L. Rhodes, and Charles M. Hains, "The influence of halftone orientation on color gamut and registration sensitivity,"*Proc. IS&T's* 46*th Annual Conference*, Pages 180-182, May, 1993.

"Misregistration Sensitivity in Clustered Dot Halftones," B. Oztan, G. Sharma, R. Loce, *Journal of Electronic Imaging* 17(2), 023004, April-June, 2008).

U.S. Patent Application Publication No. 2010/0135702, entitled "Document and Apparatus for Measuring Color-to-Color Registration," by Calamita et al., published Jun. 3, 2010.

U.S. Pat. No. 5,381,247, entitled "Method for Reducing 2-Color Moiré in 4-Color Printing," by Hains, issued Jan. 10, 1995.

S. Wang, Z. Fan and Z. Wen, "Non-orthogonal halftone screens," *Proc. NIP*18: *International Conference on Digital Printing Technologies*, Pages 578-584, 2002.

U.S. patent application Ser. No. 12/539,848, entitled "Moiré-Free Color Halftoning Methods, Apparatus and Systems," by Wang et al., filed Aug. 12, 2009.

U.S. patent application Ser. No. 12/539,925, entitled "Moiré-Free Color Halftoning Methods, Apparatus and Systems," by Wang et al., Filed Aug. 12, 2009.

U.S. patent application Ser. No. 12/647,652, entitled "System and Method for Halftoning Using a Parametrically Controlled Hexagonal Halftone Dot Shape Threshold Function," by Wang et al., Filed Dec. 28, 2009.

BRIEF DESCRIPTION

In one embodiment of this disclosure, described is a DOD (dot-off-dot) three colorant halftone image forming method for rendering an image using geometrically equivalent hexagonally tiled cluster halftone screens for rendering each colorant with an image rendering device, the method comprising a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$; b) defining a first colorant halftone screen as the base colorant halftone screen; c) defining a second colorant halftone screen as geometrically equivalent to the base colorant halftone screen, the second colorant halftone screen displaced from the first colorant halftone screen in a direction along the frequency vector $V_{h1}$ $V_{h2}$; d) defining a third colorant halftone screen as geometrically equivalent to the base colorant halftone screen, the third colorant halftone screen displaced from the first colorant halftone screen in a direction along the frequency vector $V_{h2}$ $V_{h3}$; e) applying the first, second and third colorant halftone screens, either collectively or individually, to the image to produce one or more halftone outputs representative of the image; and f) performing one of printing, either collectively or individually, the one or more halftone outputs, displaying the one or more halftone outputs, and further processing, either collectively or individually, the one or more halftone outputs.

In another embodiment of this disclosure, described is a computer program product comprising a computer-usable data carrier storing instructions that, when executed by a computer, cause the computer to perform a DOD three colorant halftone image forming method for rendering an image using geometrically equivalent hexagonally tiled cluster halftone screens for rendering each colorant with an image rendering device, the method comprising: a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$; b) defining a first colorant halftone screen as the base colorant halftone screen; c) defining a second colorant halftone screen as geometrically equivalent to the base colorant halftone screen, the second colorant halftone screen displaced from the first colorant halftone screen in a direction along the frequency vector $V_{h1}$ $V_{h2}$; d) defining a third colorant halftone screen as geometrically equivalent to the base colorant halftone screen, the third colorant halftone screen displaced from the first colorant halftone screen in a direction along the frequency vector $V_{h2}+V_{h3}$; e)

applying the first, second and third colorant halftone screens, either collectively or individually, to the image to produce one or more halftone outputs representative of the image; and f) performing one of printing, either collectively or individually, the one or more halftone outputs, displaying the one or more halftone outputs, and further processing, either collectively or individually, the one or more halftone outputs.

In still another embodiment of this disclosure, described is a printing apparatus comprising: an image marking device for rendering a color image on a media substrate; and a controller configured to receive a representation of an image for rendering on the image marking device, the controller configured to execute instructions to perform a DOD three colorant halftone image forming for rendering the image using geometrically equivalent hexagonally tiled cluster halftone screens for rendering each colorant with the image marking device, the method comprising: a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$; b) defining a first colorant halftone screen as the base colorant halftone screen; c) defining a second colorant halftone screen as geometrically equivalent to the base colorant halftone screen, the second colorant halftone screen displaced from the first colorant halftone screen in a direction along the frequency vector $V_{h1}$ $V_{h2}$; d) defining a third colorant halftone screen as geometrically equivalent to the base colorant halftone screen, the third colorant halftone screen displaced from the first colorant halftone screen in a direction along the frequency vector $V_{h2}+V_{h3}$; e) applying the first, second and third colorant halftone screens, either collectively or individually, to the image to produce one or more halftone outputs representative of the image; and f) rendering the one or more halftone outputs on one of a belt, drum and a media substrate associated with the image marking device.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DESCRIPTION

Figure 1:
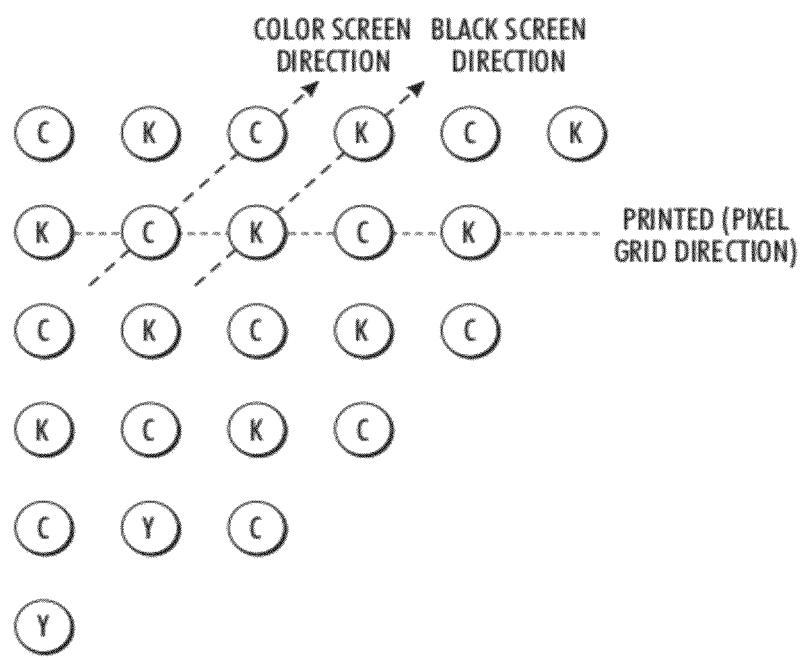
FIG. 1 is a prior art illustrating dot-off-dot halftoning for two colorants as disclosed in FIG. 4 of U.S. Pat. No. 5,594,839.

Disclosed is a halftoning geometry for 3-colorant DOD (dot-off-dot) image rendering, for example printing and/or display. The geometry is based on a hexagonal base screen, where the three colorants are printed with specific displacements of the screen. A hexagonal screen has three fundamental frequencies (and three corresponding periods), where any one of the fundamentals is dependent on the other two. Assuming the base screen is used in a reference position for one colorant, the other two colorants use the base screen displaced from the reference position. The displacements are in two different directions, each along the direction of a fundamental frequency. The amount of displacement is ⅔ of the fundamental period in that direction. DOD screens are known to produce much finer textures than conventional rotated dot screens. A motivation for the disclosure is the current problematic lack of smoothness in prints associated with some conventional printing systems. The DOD screens provide some low noise tint options for customers.

Rotated dot screens possess a texture frequency component (the rosette) that is roughly half of the halftone frequency. Conversely, periodic DOD screens can possess an apparent frequency that is significantly higher than the single separation halftone frequency. If color-to-color registration is suitably tight, DOD can produce images with much finer texture and lower noise. But, a periodic halftone geometry for DOD has not been developed for a 3-colorant color.

Disclosed herein is a halftoning geometry for 3-colorant DOD printing. The geometry is based on a hexagonal base screen, where the three colorants are printed with specific displacements of the screen. A hexagonal screen has three fundamental frequencies (and three corresponding periods), where any one of the fundamentals is dependent on the other two. Assuming the base screen is used in a reference position for one colorant, the other two colorants use the base screen displaced from the reference position. The displacements are in two different directions, each along the direction of a fundamental frequency. The amount of displacement is ⅔ of the fundamental period in that direction.

There are four primary motivations for the present disclosure, which are listed here and described in more detail below:

Provide a method that can use lower frequency single-colorant screens to reduce marking process noise in xerographic products when producing tints.

Provide a method that can have reduced low frequency halftone texture in xerographic products when producing tints.

Motivation 3 provides a new method to produce 3-colorant tints in ink jet that has an alternative appearance to vector stochastic screening. Practical use of this method may require a palette of patterns to achieve various tints.

A fourth motivation is the increase in color gamut with DOD compared to rotated screens.

As previously stated, DOD screens are known to produce much finer textures than conventional rotated dot screens. Rotated dot screens have the negative drawback of possessing a texture frequency component (the rosette) that is roughly half of the halftone frequency. Conversely, periodic DOD screens have the desirable attribute of possessing an apparent frequency that is significantly higher than the single-separation halftone frequency. One benefit of a xerographic printing system using DOD screens is the generation of acceptable textures using very low frequency halftones, which could drastically reduce mottle. It could also improve the basic appearance of the halftone texture because there would not be rosettes at ½ the halftone frequency. In addition to texture improvements, DOD halftones produce a larger gamut than rotated halftone screens (see Warren L. Rhodes, and Charles M. Hains, "The influence of halftone orientation on color gamut and registration sensitivity," *Proc. IS&T's 46th Annual Conference*, Pages 180-182, May, 1993).

With respect to ink jet printers, ink jet typically performs halftoning using DOD methods, often in the form of a vector stochastic screen. Ink jet currently can achieve tight color-to-color registration by having the different colorants in a fixed head, or printing to a well controlled web. The presently disclosed DOD methods and systems enable printing certain colors within a tint palette in ink jet printing.

With respect to clustered vs. dispersed dot halftoning, the presently disclosed DOD methods and systems have at least two potential areas of application:

Tints in ink jet, where the halftone dots are isolated pixels.

Tints in xerography and offset printing, where the halftone dots are clusters.

The following quote is from U.S. Pat. No. 5,594,839, entitled "Apparatus and Method for Improving Black and Color Separation in Halftoned Images by Printing Black Dots in a Different Screen Phase," by Shu, issued Jan. 14, 1997.

In order to reduce the visibility of the moire patterns, a different type of screen was developed by Marcel Coderch of Anaya Systems and is known as a "Flamenco" screen. In the Flamenco screen, rather than rotating the color screens relative to each other, all color dots are located on a fixed grid with optimal spacing of the dot centers. The screen angle for each color, including black, is 45°. In order to separate the dots, the color screens are offset slightly from one another in the horizontal and vertical directions causing the dots to form a repeating square pattern with a different color dot located on each corner of the square pattern.

The idea behind Flamenco screening is to keep the same angle but shift screens by certain distance. All four grids are laid right next to each other, offset by some number of pixels.

Regarding U.S. Pat. No. 5,594,839, entitled "Apparatus and Method for Improving Black and Color Separation in Halftoned Images by Printing Black Dots in a Different Screen Phase," by Shu, issued Jan. 14, 1997, the spec within the patent describes periodic DOD for two colorants. FIG. 1 (FIG. 4 in Shu's patent) only shows two colorants used in a nearby neighborhood.

Frequency Representation of Conventional Periodic Halftone Patterns.

Clustered-dot halftoning methods produce halftone images that possess strong periodic structures defined by the halftone screens. For the purposes of moiré and texture analysis, these images can be well described in the frequency domain by discrete components without regard to amplitude and phase. In this frequency domain representation, a two-dimensional halftone screen and halftone output for a single colorant x forms a frequency lattice that can be described by two generator vectors $V_{x1}$, $V_{x2}$. The generator vectors correspond to the two fundamental frequencies of the halftone. Linear combinations of these fundamental frequency vectors form all points (harmonics) in the lattice and no frequencies are formed that are lower than the fundamentals for this single colorant.

Figure 2:
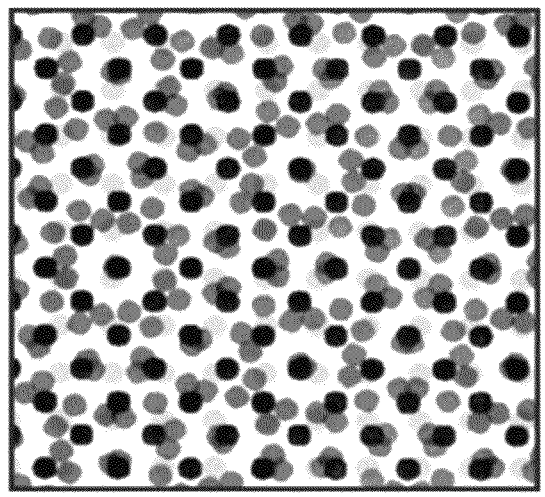
FIGS. 2 and 3 illustrate the superposition of cyan, magenta, yellow and black halftones according to a conventional configuration.
Figure 3:
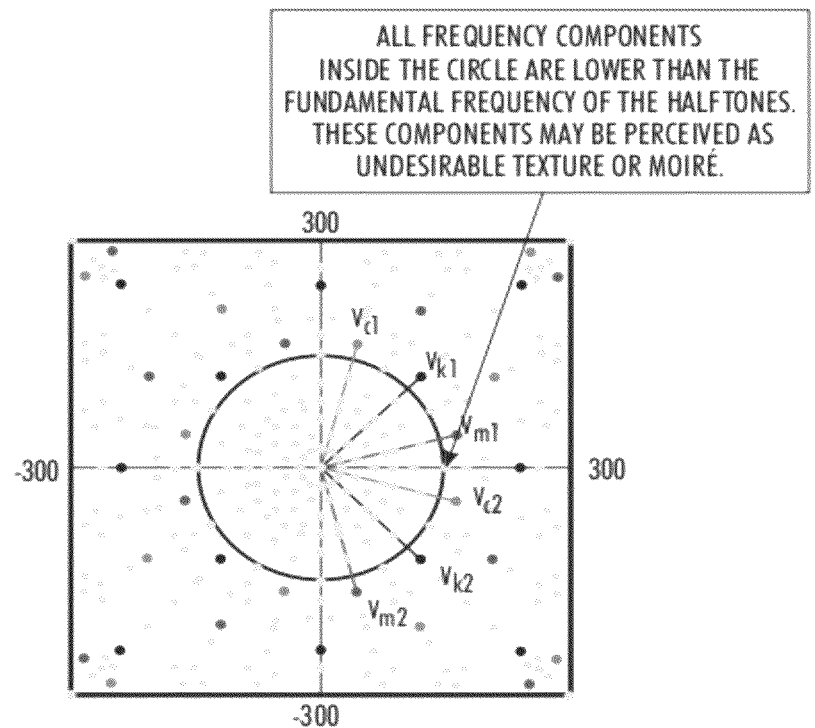

Moiré analysis for conventional halftoning focuses on Cyan, Magenta, and Black because of the overlap in the optical absorption spectra of these colorants. Yellow is usually included in some suboptimal manner, which may or may not be fully acceptable depending upon the visibility of yellow and its interaction with the other colorants The fundamental vector frequencies for C, M, and K can be denoted $V_{c1}$, $V_{c2}$, $V_{m1}$, $V_{m2}$, $V_{k1}$, and $V_{k2}$, respectively, where sub 1 and sub 2 refer to the components above and below 0°, respectively. FIG. 2 illustrates the periodic appearance for the overlay of C, M, Y and K halftone screens based on a traditional configuration, with the cyan pattern at 75°/−15°; magenta at 15°/−75°; black at 45°/−45°, and yellow at 0°/90°. The traditional configuration uses the same halftone screen for C, M, and K, with square cells rotated to given angles. The resulting combined halftone texture, often referred as the rosette pattern, is not a simple repeated pattern and its Fourier representation is complicated. FIG. 3 shows the frequency vector representation of the C, M, and K, screens, which aids in the understanding of moiré and texture.

The Fourier transform is dominated by discrete frequency components shown as circular dots. The discrete components are defined by the two fundamental halftone frequencies for each screen, their two-dimensional higher-order harmonics (which can be considered to be linear combinations of the fundamentals), and linear combinations of components from different screens (which are beats, or forms of moiré). The linear combinations are due to the overlap in the optical absorption spectra of these colorants. Yellow has very little interaction, thus it does not strong "beat" with the other colorants. Note that phase is not represented in these plots and also there are many higher-order harmonics of the halftone frequencies that not shown in the plot.

In color printing, the superposition of halftone screens creates more frequency components than exist in the single separations of the various process colors. We can express the result caused by superposition of two different colors as their frequency-vector difference, e.g., $V_{cm} = V_c \pm V_m$, where $V_c$ and $V_m$ are two frequency components from C and M, and $V_{cm}$ is the difference vector. Since each Fourier component has its conjugate, i.e., there is always a frequency vector $-V_c$ that represents the conjugate component of $V_c$, the sign definition of frequency vectors is rather arbitrary. For each halftone screen, there are two fundamental frequency vectors, therefore, the color mixing of two screens for two different colorants yields eight difference vectors by the fundamental frequencies alone. Considering other harmonics of the halftone frequencies, the combinations can yield a large number of difference vectors.

Frequency Representation of a Hexagonal Periodic Halftone Pattern

Figure 4:
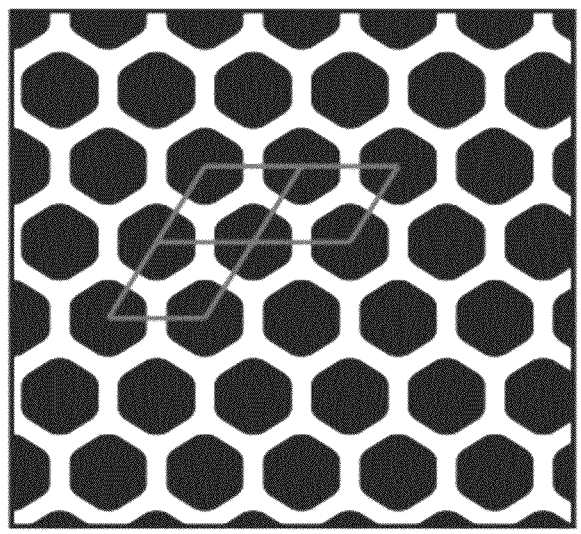
FIG. 4 illustrates a halftone pattern horizontally packed with hexagon-shaped clusters.
Figure 5:
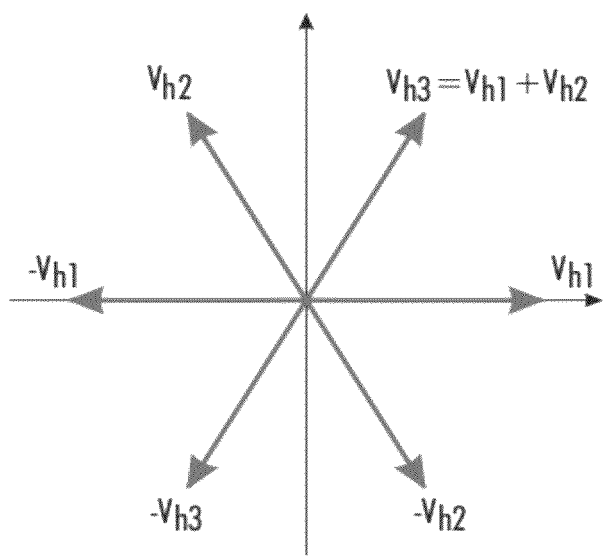
FIG. 5 is a Fourier representation of the regular hexagonal halftone pattern illustrated in FIG. 4.

Halftones with hexagonal tiling and hexagonal shape clusters are visually pleasing and theoretically the most compact halftone structure (see example illustrated in FIGS. 4 and 5). Hexagonal halftones have been discussed in several publications and patents that discuss moiré, frequency analysis, rotated screen sets, and spot functions (See U.S. Pat. No. 5,381,247, entitled "Method for Reducing 2-Color Moiré in 4-Color Printing," by Hains, issued Jan. 10, 1995; S. Wang, Z. Fan and Z. Wen, "Non-orthogonal halftone screens," *Proc. NIP18: International Conference on Digital Printing Technologies*, Pages 578-584, 2002; U.S. patent application Ser. No. 12/539,848, entitled "Moiré-Free Color Halftoning Methods, Apparatus and Systems," by Wang et al., filed Aug. 12, 2009; U.S. patent application Ser. No. 12/539,925, entitled "Moiré-Free Color Halftoning Methods, Apparatus and Systems," by Wang et al., Filed Aug. 12, 2009; and, U.S. patent application Ser. No. 12/647,652, entitled "System and Method for Halftoning using a Parametrically Controlled Hexagonal Halftone Dot Shape Threshold Function," by Wang et al., Filed Dec. 28, 2009). However, their use for DOD printing has not been explored. Notably, the DOD methods and systems disclosed below show that they are ideal for 3-color DOD halftoning.

Although the appearance of hexagonally tiled hexagon clusters is quite different from square or rectangularly tiled clusters, spatially repeated hexagons are essentially the result of tiling, or two-dimensional replication, using a parallelogram, shown in the example by the outlines. Hence, the hexagonal halftone shown in FIG. 4 is a two-dimensional periodic structure that can be represented by two fundamental frequency vectors, $V_{h1}$ and $V_{h2}$, shown in FIG. 5, defined for the corresponding non-orthogonal parallelogram screen. As discussed previously, a two-dimensionally repeated halftone pattern possesses many frequency harmonics as linear combination of the two fundamentals. For a hexagonal halftone pattern, one of the harmonics is noteworthy because its frequency vector length is exactly the same as the length of the two fundamentals if the hexagons are regular (i.e., 0-60-120-degree). The hexagons in FIG. 4 are regular and the noteworthy vector is shown as $V_{h3}=V_{h1}+V_{h2}$ in FIG. 4. Note that screens can appear to be hexagonal even if the vector lengths are not exactly equal. The hexagons will simply appear more irregular as the vector lengths increasingly differ.

It is not difficult to see that any two of the three vectors, $V_{h1}$, $V_{h2}$ and $V_{h3}$, can be used as fundamental frequency vectors and the third is always equal to the sum of the two fundamentals (or their conjugates). Thus, the set of three may be loosely referred to as the "fundamentals" of a hexagonal halftone screen.

Figure 6:
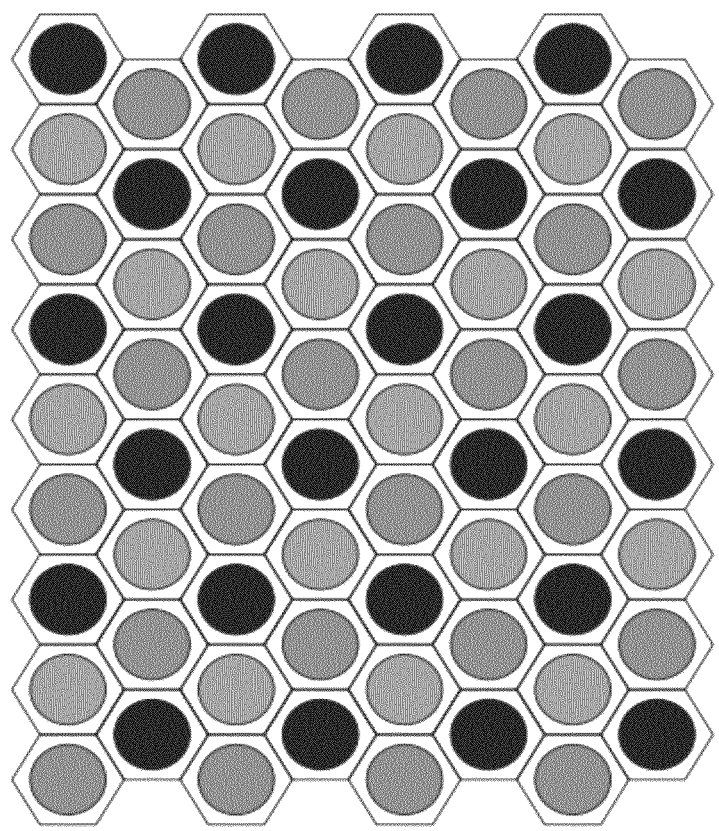
FIG. 6 is a schematic of a 3-colorant DOD hexagonal halftone screen according to an exemplary embodiment of this disclosure. Notably—the black hexagon outlines would not be included in the rendered image and are provided merely to better illustrate the hexagonal pattern.
Figure 7:
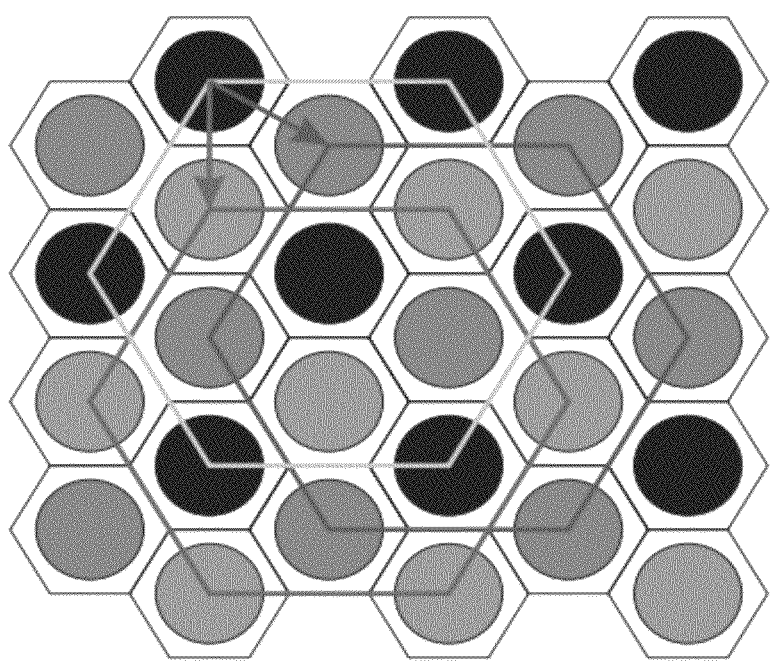
FIG. 7 is another schematic of a 3-colorant DOD hexagonal halftone screen showing hexagonal neighbors associated with a halftone dot and displacements for the various colorants.

The presently disclosed DOD methods and systems include a halftoning geometry for 3-color dot-off-dot printing. The geometry is based on a hexagonal base screen, where the three colorants are printed with specific displacements of this screen. FIG. 6 shows a schematic example of such a 3-colorant halftone using cyan, magenta and black dots. FIG. 7 is another schematic representation of the 3-colorant halftone geometry, where hexagonal neighboring cells and their displacements are shown.

As described above, a hexagonal screen has three fundamental frequencies (and three corresponding periods), where any one of the fundamentals can be considered dependent on the other two. Assume that the base screen is used in a reference position for one colorant and the other two colorants use the base screen displaced from the reference position. The displacements are in two different directions, each along the direction of a fundamental frequency. The amount of displacement is ⅔ of the fundamental period in that direction.

Figure 8:
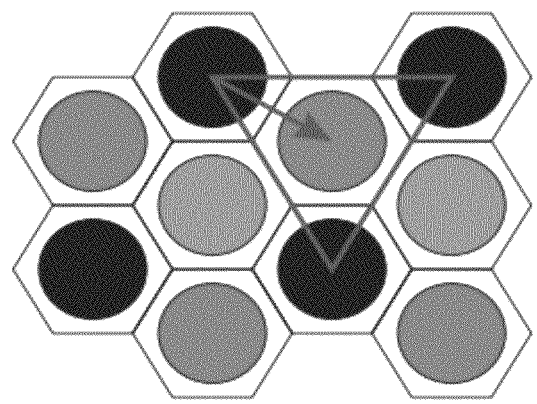
FIGS. 8 and 9 are other schematics of a 3-colorant DOD hexagonal halftone screen which shows hexagonal neighbors of a halftone dot and various displacements for the various colorants.
Figure 9:
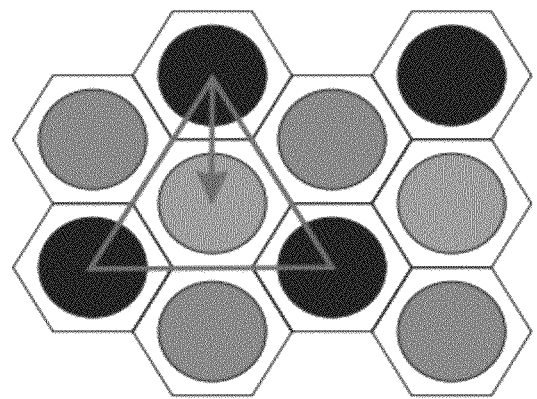

To provide a better understanding of the displacement, consider FIGS. 8 and 9, which show triangle relationships between neighboring halftone dots for a hexagonal screen. In the figure, black is assumed to be the reference screen. The other screens are shifted to centroids of the triangles of three nearest neighbors of the hexagonal geometry. The centroid is the intersection of the medians of the triangles, where the medians are defined to be the lines that extend from a vertex to the midpoint of an opposite side. The centroid is ⅔ of the way from the vertex to the side. For a first colorant displaced from the reference screen (e.g., cyan), the displacement could be in any of three directions defined by the three medians. For a second colorant displaced from the reference screen (e.g., magenta), the reference triangle must share a side with the triangle of the first displaced colorant.

Figure 10:
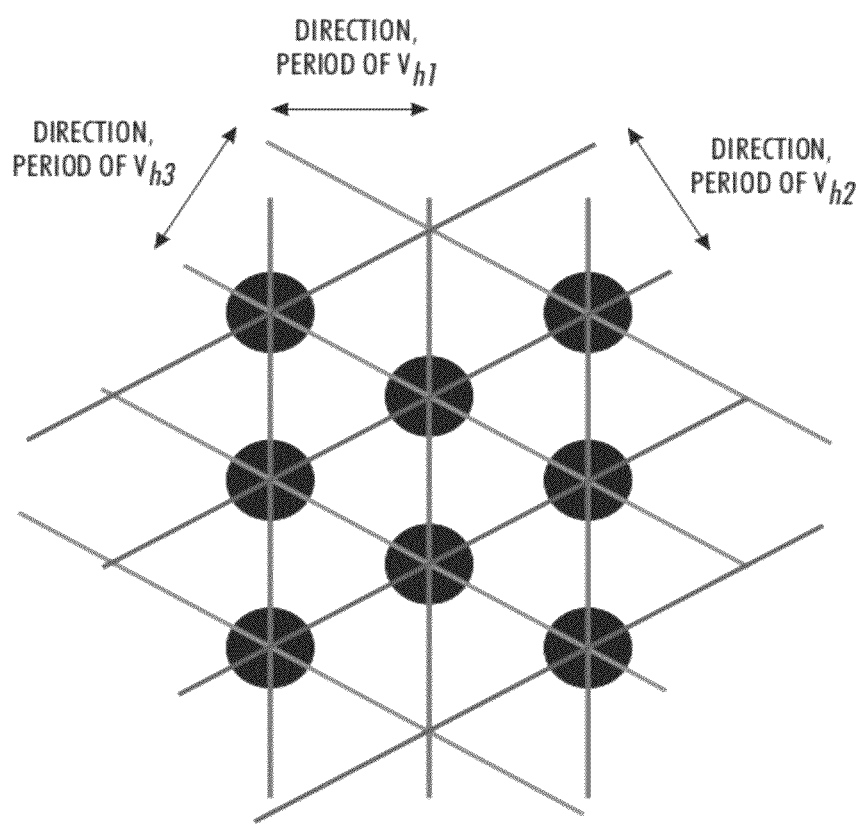
FIG. 10 is a schematic illustrating the fundamental periods of a single colorant hexagonal screen according to an exemplary embodiment of this disclosure.
Figure 11:
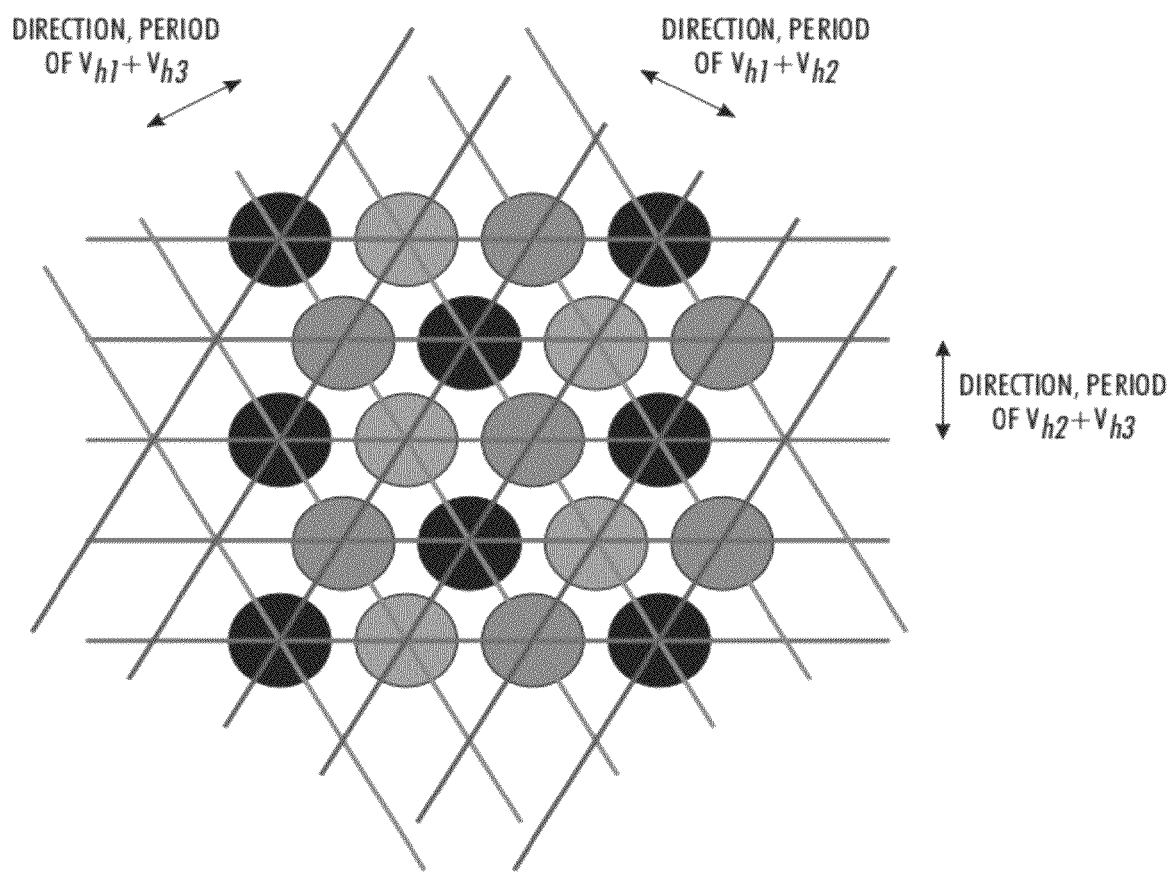
FIG. 11 is a schematic illustrating the fundamental periods of a 3-colorant DOD hexagonal screen according to an exemplary embodiment of this disclosure.
Figure 12:
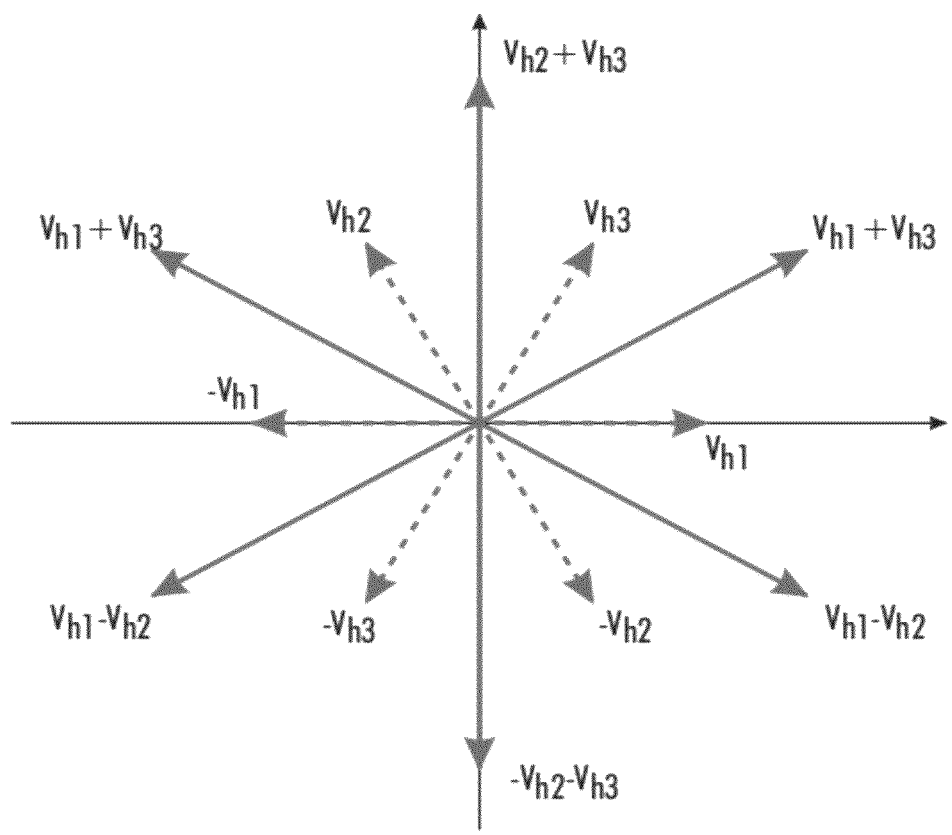
FIG. 12 is a frequency vector diagram for a 3-colorant hexagonal DOD screen according to an exemplary embodiment of this disclosure. Notably, the dashed vectors represent the fundamentals of the single-colorant halftone. In this configuration, these components have low amplitude.

By comparing FIG. 2 to FIGS. 10-12, provided is a better understanding of the nature of the texture difference between a multicolor rotated dot screen and the presently disclosed 3-colorant DOD screen. FIG. 10 shows the fundamental periods of a single-colorant hexagonal screen, which corresponds to the spectrum shown in FIG. 5. FIG. 11 shows the fundamental periods for the 3-colorant screen. Note that the frequencies of the texture are higher than in the mono case. FIG. 12 shows the frequency vector diagram for the 3-colorant hexagonal DOD screen. In comparing FIG. 12 to the frequency diagram in FIG. 3, it is seen that combining the rotated screens produces lower (unwanted) frequency components than what exists in the single-colorant spectrum. These components are considered beats or forms of moiré due to the interaction of the colorants, such as overlap in their optical absorption spectra. Printing DOD using the presently disclosed DOD screens produces higher frequencies than the single-colorant screen. The overlap in absorption spectra actually suppresses the fundamental frequencies and the combined screens appear to have a higher "combined fundamental frequency." This phenomenon can be understood by examining a limiting case of optical spectra overlap, where black halftones are substituted for the cyan and magenta halftones in FIG. 11. The additional dots eliminate the single-screen fundamental frequency, and the result is a higher "combined fundamental frequency." Since cyan and magenta absorption spectra do not completely overlap, the single-screen fundamental frequency is not completely suppressed, but its appearance is significantly reduced as is shown in the example below. This suppression of single-screen fundamental frequency allows the use of very low frequency single-colorant screens, which tend to have low noise, while achieving a high frequency appearance for 3-color tints.

Comments on Usage Versus Vector DOD Screens.

Vector halftoning methods use a single stochastic screen to optimize the amount of dot-off-dot structure in a halftone image. Vector methods can be adjusted to work with any number of colorants. The drawback is the need to have a cross-channel image path. That is, the image path must have the values of all co-located pixels for the various colorants to make a halftoning decision about any colorant. Currently, laser printers that operate in this manner are not available. The presently disclosed DOD screens can operate within currently available image paths, given a tag from the DFE that indicates the 3 colorants to be screened in a tinted object.

Example

The example below compares a 3-colorant DOD screen with a combined fundamental frequency of roughly 170 cpi to a rotated screen set with fundamental frequencies of roughly 170 cpi.

Parameters for the DOD Screen (at 2400 spi)
Base screen: $V_1$=115.2 cpi, 60.3°; $V_2$=115.2 cpi, −60.3°; $V_3$=114.3, 0°
Spatial vectors: $v_1$=(24,0) and $v_2$=(12,21)
Shift for each screen: Shift$_K$=0,0; Shift$_M$=0,17; Shift$_c$=12,7
Parameters for Rotated Screens (at 2400 spi)
Black screen: $V_1$=170 cpi, 45°; $V_2$=170 cpi, −45°
Cyan screen: $V_1$=170 cpi, 75°; $V_2$=170 cpi, −15°
Magenta screen: $V_1$=170 cpi, 15°; $V_2$=170 cpi, −75°

Figure 13:
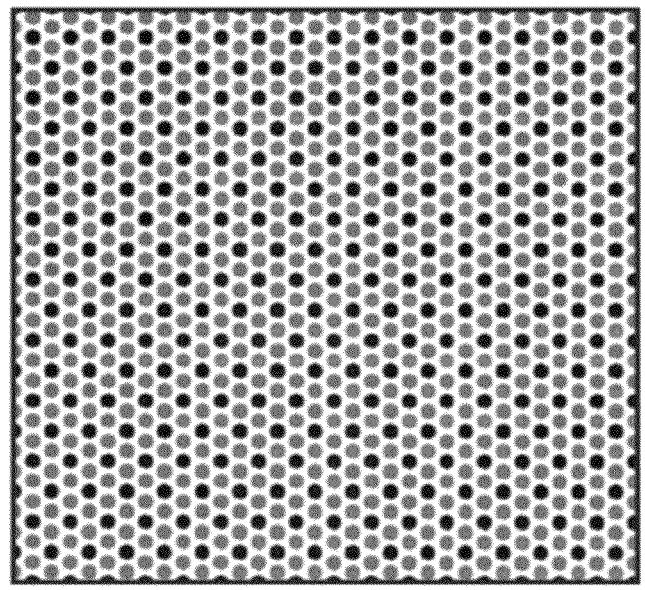
FIG. 13 illustrates a 3-colorant DOD screen according to an exemplary embodiment of this disclosure.
Figure 14:
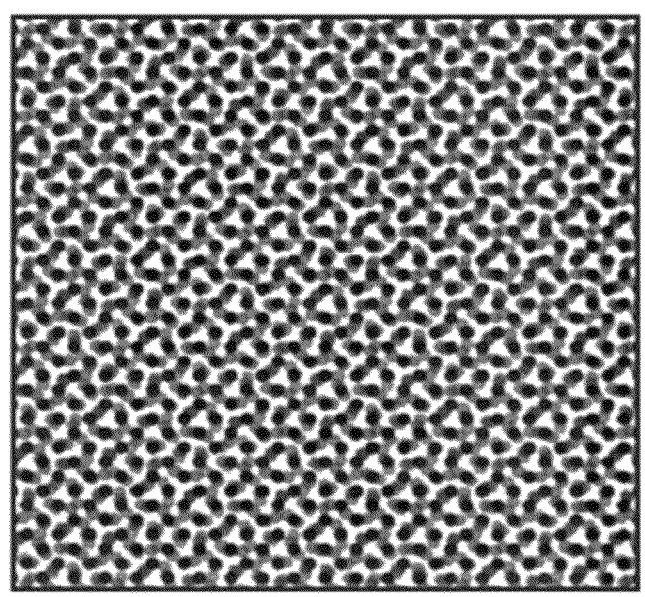
FIG. 14 illustrates, for comparison with FIG. 13, a conventional rotated 3-colorant screen.

FIGS. 13 and 14 show a comparison of appearance for the two halftoning methods. FIG. 13 shows a fine texture, while significant portions of the marking process (exposure, development) operated at only 115 cpi, thereby producing a relatively low noise print. On the other hand, the rotated screens of FIG. 14 show less desirable low feature texture while operating at a noisier, less stable 170 cpi.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A DOD (dot-off-dot) three colorant halftone image forming method for rendering an image using geometrically equivalent hexagonally tiled cluster halftone screens for rendering each colorant with an image rendering device, the method comprising:
    a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$;
    b) defining a first colorant halftone screen as the base colorant halftone screen;
    c) defining a second colorant halftone screen as geometrically equivalent to the base colorant halftone screen, the second colorant halftone screen displaced from the first colorant halftone screen in a direction along the frequency vector $V_{h1}-V_{h2}$;
    d) defining a third colorant halftone screen as geometrically equivalent to the base colorant halftone screen, the third colorant halftone screen displaced from the first colorant halftone screen in a direction along the frequency vector $V_{h2}+V_{h3}$;
    e) applying the first, second and third colorant halftone screens, either collectively or individually, to the image to produce one or more halftone outputs representative of the image; and
    f) performing one of printing, either collectively or individually, the one or more halftone outputs, displaying the one or more halftone outputs, and further processing, either collectively or individually, the one or more halftone outputs.

2. The method according to claim 1, further comprising:
    applying the first colorant halftone screen to the image to produce a first colorant halftone output;
    applying the second colorant halftone screen to the image to produce a second colorant halftone output; and
    applying the third colorant halftone screen to the image to produce a third colorant halftone output.

3. The method according to claim 2, step e) further comprising:
    overlaying the first colorant halftone output, the second colorant halftone output, and the third colorant halftone output to produce a halftone output representative of the image.

4. The method of claim 1, wherein one or more of the defined colorant halftone screens are associated with one of cyan, magenta, yellow, black, red, green, blue, orange, violet, gray, light cyan, light magenta, and dark yellow.

5. The method of claim 1, wherein a rectangular pixel grid is associated with the image rendering device.

6. The method of claim 1, wherein steps b), c) and d) generate a digital representation of the first, second and third colorant halftone screens, either collectively or individually.

7. A computer program product comprising:
    a non-transitory computer-usable data carrier storing instructions that, when executed by a computer, cause the computer to perform a DOD three colorant halftone image forming method for rendering an image using geometrically equivalent hexagonally tiled cluster halftone screens for rendering each colorant with an image rendering device, the method comprising:
    a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$;
    b) defining a first colorant halftone screen as the base colorant halftone screen;
    c) defining a second colorant halftone screen as geometrically equivalent to the base colorant halftone screen, the second colorant halftone screen displaced from the first colorant halftone screen in a direction along the frequency vector $V_{h1}-V_{h2}$;
    d) defining a third colorant halftone screen as geometrically equivalent to the base colorant halftone screen, the third colorant halftone screen displaced from the first colorant halftone screen in a direction along the frequency vector $V_{h2}+V_{h3}$;
    e) applying the first, second and third colorant halftone screens, either collectively or individually, to the image to produce one or more halftone outputs representative of the image; and
    f) performing one of printing, either collectively or individually, the one or more halftone outputs, displaying the one or more halftone outputs, and further processing, either collectively or individually, the one or more halftone outputs.

8. The computer program product according to claim 7, step e) further comprising:
    applying the first colorant halftone screen to the image to produce a first colorant halftone output;
    applying the second colorant halftone screen to the image to produce a second colorant halftone output; and
    applying the third colorant halftone screen to the image to produce a third colorant halftone output.

9. The computer program product according to claim 8, step e) further comprising:
    overlaying the first colorant halftone output, the second colorant halftone output, and the third colorant halftone output to produce a halftone output representative of the image.

10. The computer program product according to claim 7, wherein one or more of the defined colorant halftone screens are associated with one of cyan, magenta, yellow, black, red, green, blue, orange, violet, gray, light cyan, light magenta, and dark yellow.

11. The computer program product according to claim 7, wherein a rectangular pixel grid is associated with the image rendering device.

12. The computer program product according to claim 7, wherein steps b), c) and d) generate a digital representation of the first, second and third colorant halftone screens, either collectively or individually.

13. A printing apparatus comprising:
an image marking device for rendering a color image on a media substrate; and
a controller configured to receive a representation of an image for rendering on the image marking device, the controller configured to execute instructions to perform a DOD three colorant halftone image forming method for rendering the image using geometrically equivalent hexagonally tiled cluster halftone screens for rendering each colorant with the image marking device, the method comprising:
a) defining a base colorant halftone screen with hexagonally tiled halftone dots arranged in a hexagonal pattern, the hexagonally tiled halftone dots having a first fundamental frequency vector $V_{h1}$, a second fundamental frequency vector $V_{h2}$, and a third fundamental frequency vector $V_{h3}$, where $V_{h3}$ is substantially equivalent to $V_{h1}+V_{h2}$;
b) defining a first colorant halftone screen as the base colorant halftone screen;
c) defining a second colorant halftone screen as geometrically equivalent to the base colorant halftone screen, the second colorant halftone screen displaced from the first colorant halftone screen in a direction along the frequency vector $V_{h1}-V_{h2}$;
d) defining a third colorant halftone screen as geometrically equivalent to the base colorant halftone screen, the third colorant halftone screen displaced from the first colorant halftone screen in a direction along the frequency vector $V_{h2}+V_{h3}$;
e) applying the first, second and third colorant halftone screens, either collectively or individually, to the image to produce one or more halftone outputs representative of the image; and
f) rendering the one or more halftone outputs on one of a belt, drum and a media substrate associated with the image marking device.

14. The printing apparatus according to claim 13, step e) further comprising:
applying the first colorant halftone screen to the image to produce a first colorant halftone output;
applying the second colorant halftone screen to the image to produce a second colorant halftone output; and
applying the third colorant halftone screen to the image to produce a third colorant halftone output.

15. The printing apparatus according to claim 14, step e) further comprising:
overlaying the first colorant halftone output, the second colorant halftone output, and the third colorant halftone output to produce a halftone output representative of the image.

16. The printing apparatus according to claim 13, wherein one or more of the defined colorant halftone screens are associated with one of cyan, magenta, yellow, black, red, green, blue, orange, violet, gray, light cyan, light magenta, and dark yellow.

17. The printing apparatus according to claim 13, wherein a rectangular pixel grid is associated with the image marking device.

18. The printing apparatus according to claim 13, wherein steps b), c) and d) generate a digital representation of the first, second and third colorant halftone screens, either collectively or individually.

* * * * *